United States Patent
Kodukula et al.

(10) Patent No.: US 7,323,977 B2
(45) Date of Patent: Jan. 29, 2008

(54) TUNABLE RFID TAG FOR GLOBAL APPLICATIONS

(75) Inventors: Venkata S. Kodukula, Bothell, WA (US); Pavel Nikitin, Seattle, WA (US); For Sander Lam, Bothell, WA (US)

(73) Assignee: Intermec IP Corp., Woodland Hills, CA (US)

( * ) Notice: Subject to any disclaimer, the term of this patent is extended or adjusted under 35 U.S.C. 154(b) by 271 days.

(21) Appl. No.: 11/081,239

(22) Filed: Mar. 15, 2005

(65) Prior Publication Data

US 2006/0220869 A1 Oct. 5, 2006

(51) Int. Cl.
G08B 26/00 (2006.01)
G08B 13/14 (2006.01)
H01Q 21/12 (2006.01)

(52) U.S. Cl. ............... 340/505; 340/572.1; 340/572.7; 340/572.8; 340/10.1; 343/815; 343/834; 342/42; 342/51

(58) Field of Classification Search ............... 340/505, 340/572.7, 572.8; 343/815, 834
See application file for complete search history.

(56) References Cited

U.S. PATENT DOCUMENTS

| | | | | |
|---|---|---|---|---|
| 6,028,564 A | * | 2/2000 | Duan et al. ............... 343/818 |
| 6,046,703 A | * | 4/2000 | Wang et al. ............... 343/795 |
| 6,154,137 A | * | 11/2000 | Goff et al. ............... 340/572.4 |
| 6,285,342 B1 | * | 9/2001 | Brady et al. ............... 343/895 |
| 6,535,175 B2 | * | 3/2003 | Brady et al. ............... 343/795 |
| 2001/0021643 A1 | * | 9/2001 | Itoh ............................. 455/90 |
| 2005/0046573 A1 | * | 3/2005 | Velasco et al. ........... 340/572.8 |
| 2005/0270159 A1 | * | 12/2005 | Brady et al. ............. 340/572.1 |

* cited by examiner

*Primary Examiner*—Donnie L. Crosland
(74) *Attorney, Agent, or Firm*—O'Melveny & Myers LLP (57) ABSTRACT

An RF transponder comprises a transponder integrated circuit, an antenna connected to the transponder integrated circuit, and at least one parasitic element adapted to interact electrically with the antenna and thereby affect antenna impedance. The orientation of the parasitic element with respect to the antenna is selected to achieve a desired operational frequency band for the RF transponder. Specifically, the spacing between the antenna and the parasitic element is selected to achieve the desired operational frequency band. For example, a first selected spacing may enable an operational frequency band suitable for a first geographic region (e.g., the United States), a second selected spacing may enable an operational frequency band suitable for a second geographic region (e.g., Europe), and a third selected spacing may enable an operational frequency band suitable for a third geographic region (e.g., Japan).

38 Claims, 6 Drawing Sheets

TUNABLE RFID TAG FOR GLOBAL APPLICATIONS

BACKGROUND OF THE INVENTION

1. Field of the Invention

The present invention relates to radio frequency identification (RFID) systems. More particularly, the invention relates to a tag containing an RFID transponder having an antenna that can be easily tuned for use throughout the world in accordance with any national or regional standards.

2. Description of Related Art

Radio frequency transponders are used in many applications. In the automatic data identification industry, the use of RFID transponders (also known as RFID tags) has grown in prominence as a way to obtain data regarding an object onto which an RFID tag is affixed. An RFID tag generally includes a memory in which information may be stored. An interrogator containing a transmitter-receiver unit is used to query an RF tag that may be at a distance from the interrogator and moving relative to the interrogator. The RFID tag detects the interrogating signal and transmits a response signal containing encoded data back to the interrogator. Such RFID tags may have a memory capacity of several kilobytes or more, which is substantially greater than the maximum amount of data that may be contained in a bar code symbol or other types of human-readable indicia. Further, the RFID tag memory may be re-written with new or additional data, which would not be possible with a printed bar code symbol. RFID tags may also be readable at a distance without requiring a direct line-of-sight view by the interrogator, unlike bar code symbols or other types of human-readable indicia that must be within a direct line-of-sight and which may be rendered entirely unreadable if obscured or damaged. The RFID tags may either extract their power from the RF interrogating field provided by the interrogator, or may include their own internal power source (e.g., battery).

More particularly, an RFID tag includes a semiconductor chip containing RF circuitry, control logic, and memory. The semiconductor chip may be mounted on a substrate that also includes an antenna. In some applications, RFID tags are manufactured by mounting the individual elements to a circuit card made of epoxy-fiberglass composition or ceramic. The antennas are generally sections of wire (e.g., loops) soldered to the circuit card or consist of metal etched or plated onto the circuit card. The whole assembly may be encapsulated, such as by enclosing the circuit card in a plastic box or molded into a three dimensional plastic package. Recently, thin flexible substrates such as polyamide have been used to reduce the size of the RFID tag in order to increase the number and type of applications to which they may be utilized.

For commercial applications, such as pallet and container tracking, and truck and trailer tracking in shipping yards, it is known to utilize RFID tags that are tuned for communication in the ultra-high frequency (UHF) band (868 MHz-928 MHz). The UHF band represents a reasonable compromise between antenna size and transmitting range. Since the size of the antenna becomes smaller as the transmitting frequency increases, an RFID antenna suitable for UHF communications becomes small enough to be included in a conventional size shipping label. But, a drawback of using the UHF RFID tags is that there isn't one single global standard for UHF communications. In North America, UHF can be used unlicensed for 908-928 MHz, but restrictions exist for transmission power. In Europe, UHF is under consideration for 865.6-867.6 MHz. Its usage is unlicensed for 869.40-869.65 MHz only, but restrictions exist for transmission power. The North-American UHF standard (908-928 MHz) is not accepted in France as it interferes with its military bandwidths. For China and Japan, there is no regulation for the use of UHF, but each application for UHF in these countries requires a site license, which needs to be applied for at the local authorities and can be revoked. For Australia and New Zealand, 918-926 MHz is available for unlicensed use, but restrictions exist for transmission power. Thus, RFID tags communicating in the UHF spectrum must be specifically tuned for each regional/national application, and there is no single UHF RFID tag available for global use.

Accordingly, it would be very desirable to provide an RF tag that can be tuned for use under any national or regional standards.

SUMMARY OF THE INVENTION

The present invention provides an RF tag having an antenna that can be selectively tuned for use in certain geographic regions. The tuning can be performed by the user to thereby customize the RF tag for a particular usage.

More particularly, the RF transponder comprises a transponder integrated circuit, an antenna connected to the transponder integrated circuit, and at least one parasitic element adapted to interact electrically with the antenna and thereby affect antenna impedance. The orientation of the parasitic element with respect to the antenna is selected to achieve a desired operational frequency band for the RF transponder. Specifically, the spacing between the antenna and the parasitic element is selected to achieve the desired operational frequency band. For example, a first selected spacing may enable an operational frequency band suitable for a first geographic region (e.g., the United States), a second selected spacing may enable an operational frequency band suitable for a second geographic region (e.g., Europe), and a third selected spacing may enable an operational frequency band suitable for a third geographic region (e.g., Japan).

In an embodiment of the invention, the RF transponder further comprises a substrate layer, with the transponder integrated circuit and antenna being affixed to the substrate layer. The substrate layer may further include indicia provided thereon defining plural predetermined locations for affixing the parasitic elements thereto. The parasitic elements may further include an adhesive layer permitting attachment to the plural predetermined locations. Alternatively, the parasitic elements may be formed on an insert card that is placed in close proximity to the substrate layer. The insert card may be adhesively coupled to the substrate layer. The parasitic elements may be printed on the insert card using conductive ink.

A more complete understanding of the RF tag that can be tuned for global usage will be afforded to those skilled in the art, as well as a realization of additional advantages and objects thereof, by a consideration of the following detailed description of the preferred embodiment. Reference will be made to the appended sheets of drawings, which will first be described briefly.

DETAILED DESCRIPTION OF THE PREFERRED EMBODIMENT

The present invention satisfies the need for an RF tag that can be tuned for use under any national or regional standards. In the detailed description that follows, like element numerals are used to describe like elements illustrated in one or more of the figures.

Figure 1:
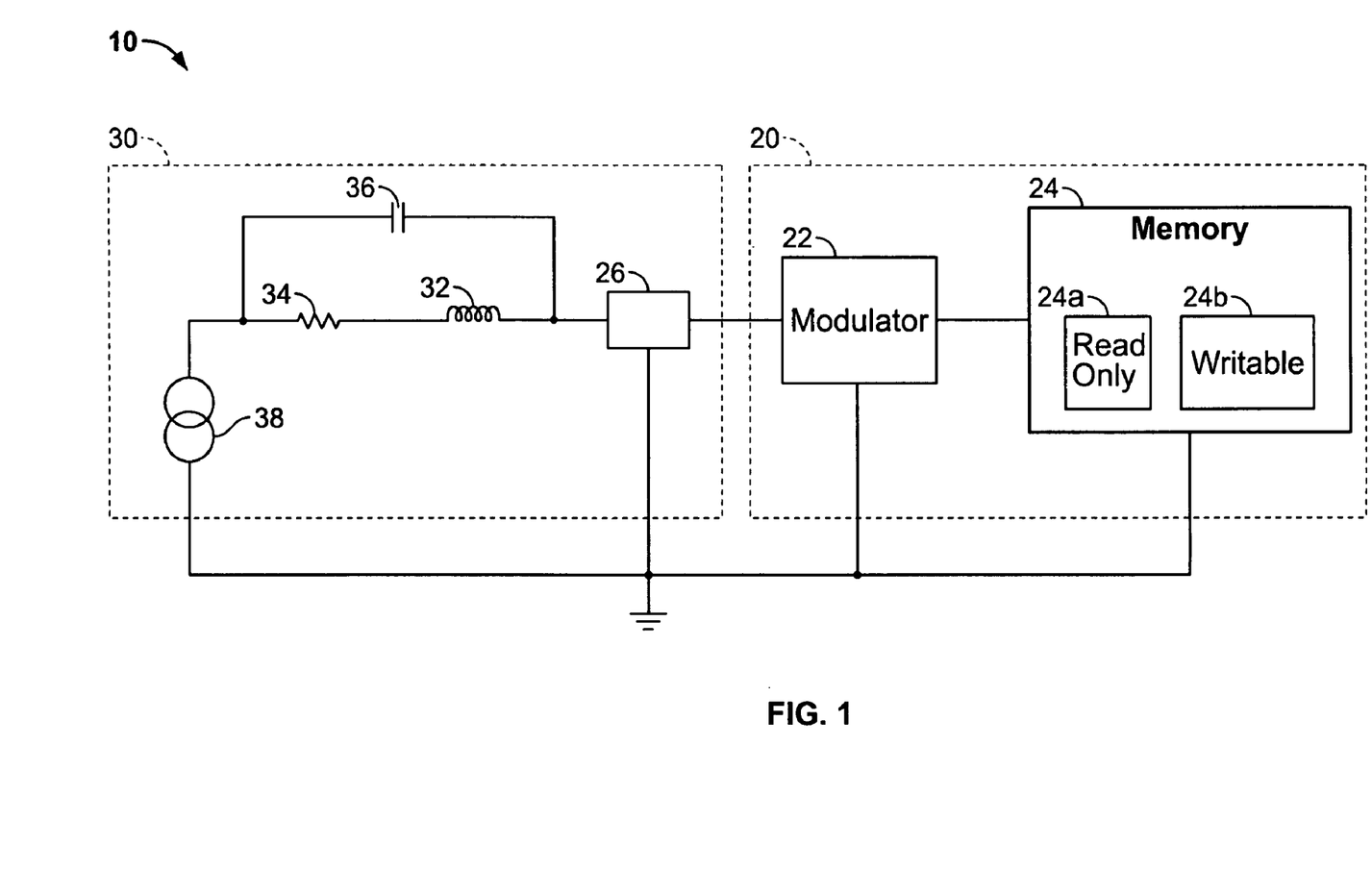
FIG. 1 is an electrical schematic drawing of an exemplary RF tag.

Referring first to FIG. 1, an exemplary circuit schematic of an RF tag 10 is shown. The RF tag 10 includes a transponder circuit 20 and an antenna 30. The transponder circuit 20 further includes a modulator 22 and a memory 24. The modulator 22 provides the function of communicating data signals to and from the antenna 30, and the memory 24 provides the function of storing data. The memory 24 may further include a read-only portion 24A that includes data that may not be altered, and a writable portion 24B that may be selectively written-to by a remote interrogator. The transponder circuit may further comprise an RFID transponder, such as disclosed by U.S. Pat. No. 4,786,907, issued Nov. 22, 1998, for "Transponder Useful In A System For Identifying Objects," the subject matter of which is incorporated by reference herein. The antenna 30 generates an alternating voltage from the signal transmitted from an RF interrogator (not shown) represented by a generator 38. A resistor 34 and an inductor 32 in parallel with a capacitor 36 represent the impedance of the antenna 30. An impedance matching section 26 connects the antenna 30 to the transponder circuit 20. The transponder circuit 20 may further comprise a semiconductor circuit chip having conductive pads or connectors that are electrically connected to the antenna 30.

It is necessary that the antenna 30 connected to the transponder circuit 20 produce an output voltage that is above a particular threshold voltage. To optimize the voltage and/or power produced for the RF tag, there must be a good impedance match between the antenna 30 and the transponder circuit 20 at the resonance frequency. If the impedance match is not optimal, the RF tag will have a limited range (i.e., distance) over which it can communicate. It is known to provide the antenna 30, preferably a dipole antenna, with one or more parasitic elements that are placed adjacent to the elements of the antenna at a spacing distance. By adjusting the length, width, and/or spacing distance and/or the number of parasitic elements, the real part of the antenna input impedance can be changed.

More particularly, the effect of parasitic elements is to suppress (i.e., reduce) the imaginary part of the antenna input impedance $X_a$. This suppression is observed over a bandwidth and causes the decrease in the tag resonant frequency. The parasitic elements also affects the real part of the antenna input impedance; however, the change in tag resonant frequency is mostly due to the change in the imaginary part of the antenna input impedance $X_a$. This phenomenon is illustrated by considering FIGS. 2 and 3, which are graphs illustrating the effect of parasitic elements on the real and imaginary parts of antenna impedance, respectively. Each graph includes a first plot showing relationship between impedance and frequency for an antenna without parasitic elements and a second plot showing the same relationship for an antenna with parasitic elements separated from the antenna by a spacing of 5 mm. It should be readily apparent from inspection of these graphs that adding the parasitic elements has a significant impact on both the real part of antenna impedance $R_a$ and the imaginary part of antenna impedance $X_a$, which together constitute the complex antenna impedance $Z_a$ (i.e., $R_a+jX_a$).

Figure 2:
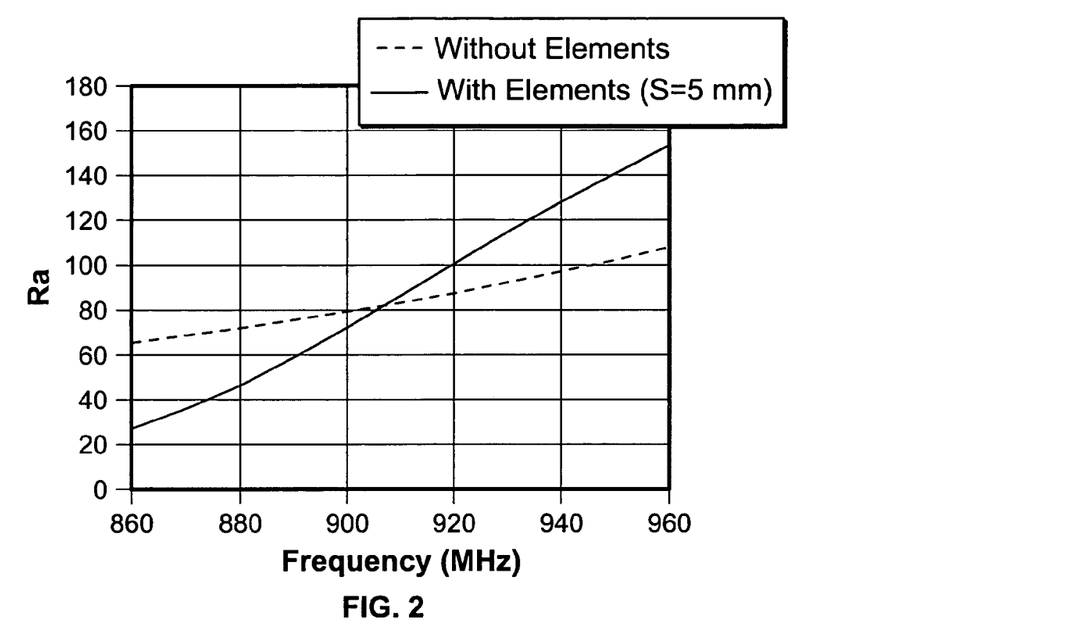
FIG. 2 is a graph illustrating effect of parasitic elements on real part of antenna impedance.
Figure 3:
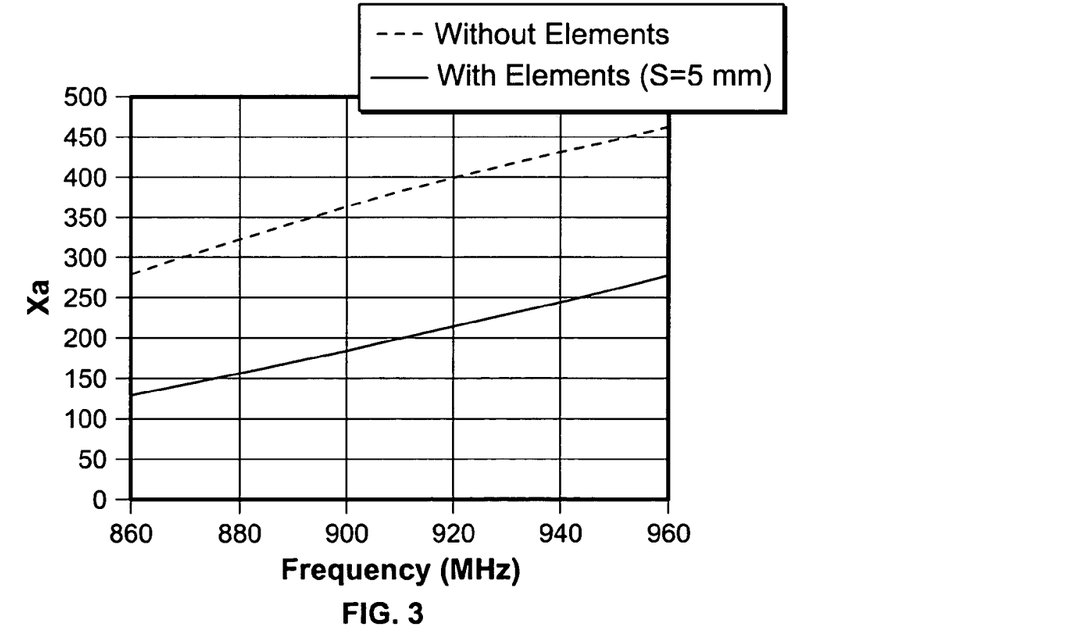
FIG. 3 is a graph illustrating effect of parasitic elements on imaginary part of antenna impedance.

The tag resonant frequency (i.e., the frequency at which the tag best operates) is determined by the point where the imaginary part of the antenna impedance $X_a$ is approximately equal to the imaginary part of the transponder chip impedance $-X_c$. It should be appreciated that the real part of the antenna impedance $R_a$ also has an effect on the tag resonant frequency, although it is less significant than the effect of the imaginary part of the antenna impedance $X_a$. In general, the smaller the spacing between the parasitic elements and the antenna, the more significant is the suppression of the imaginary part of the antenna input impedance $X_a$.

Figure 4:
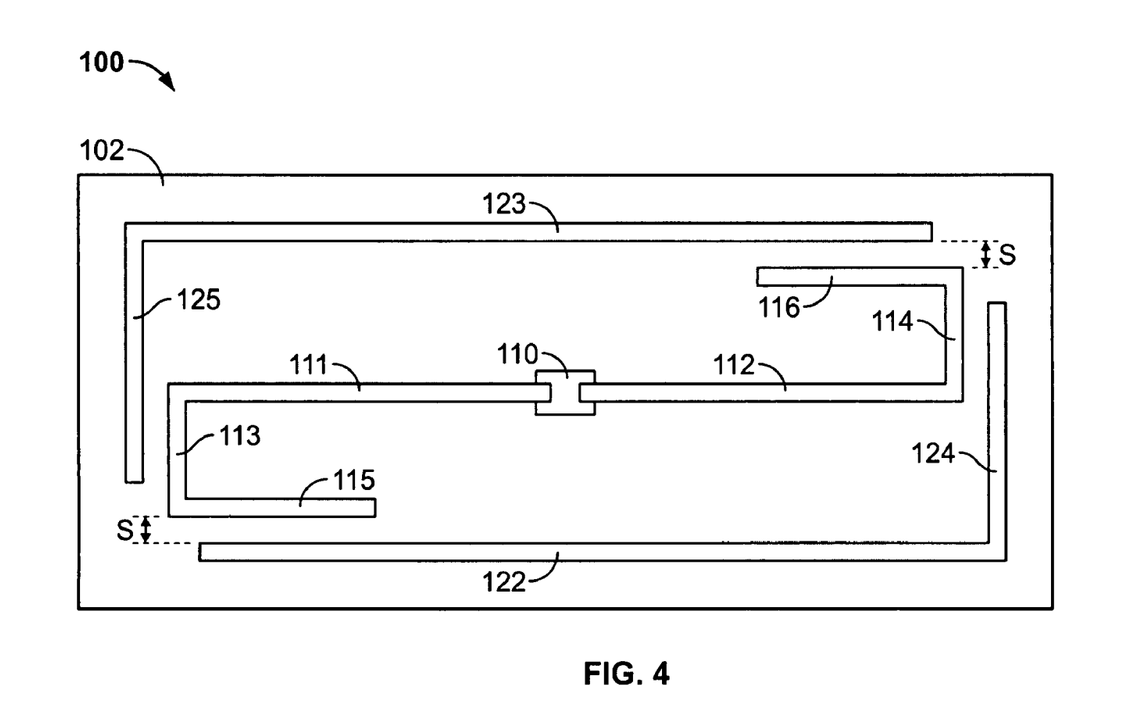
FIG. 4 is a plan view of a global RF tag in accordance with an embodiment of the invention.

FIG. 4 illustrates an exemplary RF tag 100 in accordance with the present invention. The RF tag 100 includes a substrate 102 of suitable material, such as a flexible laminated organic material such as polyimide, polyester, or the like. A radio frequency transponder circuit 110 is affixed to the substrate 102, and comprises an integrated circuit chip containing the transponder circuit 20 described above with respect to FIG. 1. A dipole antenna is operatively coupled to the transponder circuit 110. The dipole antenna comprises a first dipole section 111 and a second dipole section 112 each extending laterally from the transponder circuit 110. The first dipole section 111 may be further coupled to additional sections 113, 115 in series, and the second dipole section 112 may be further coupled to additional sections 114, 116 in series, thereby providing a folded dipole configuration. The additional sections 113, 114 extend perpendicularly from the first and second sections 111, 112 in opposite directions, with the additional sections 115, 116 extending perpendicularly from sections 113, 114 in a direction parallel to sections 111, 112.

Figure 5:
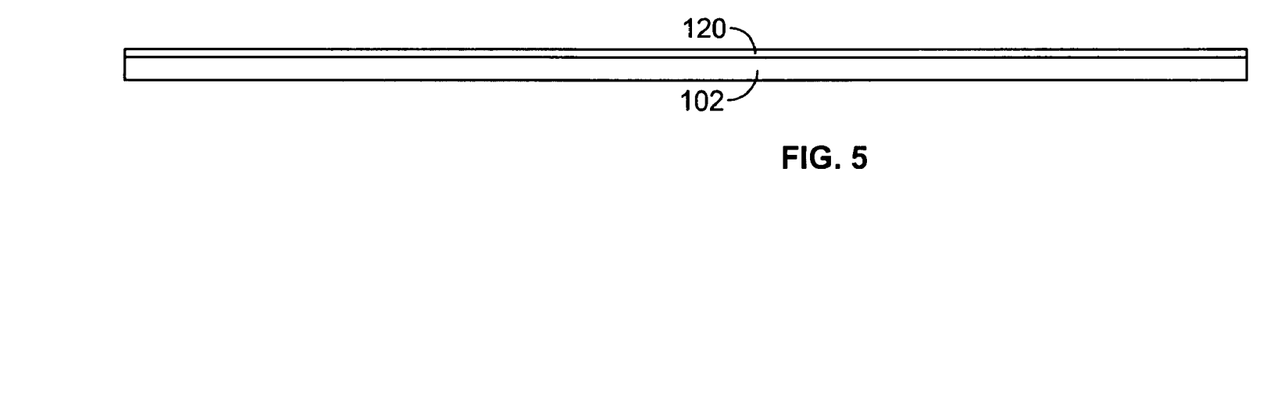
FIG. 5 is a side view of the RF tag of FIG. 4.
Figure 9A:
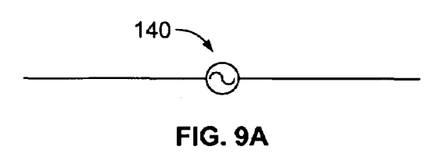
FIG. 9 is a plan view of a global RF tag in accordance with an alternative embodiment of the invention.
Figure 9B:
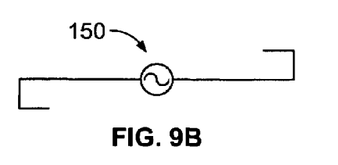
Figure 9C:
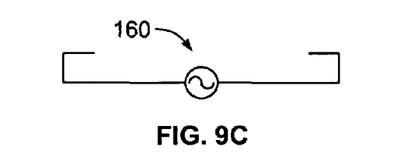
Figure 9D:
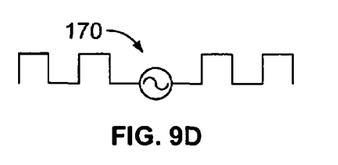

The various dipole antenna sections may be affixed to the substrate 102 in the form of conducting metal traces fabricated various known ways, such as by forming a metallized layer onto the substrate 102 that is selectively etched to form the desired pattern. FIG. 5 illustrates a side view of the RF tag 100 showing the substrate 102 having conducting traces 120 affixed thereto. As generally known in the art, many alternative antenna configurations or geometries (e.g., dipole, folded dipole, loop, coil, spiral, meander, etc.) may also be advantageously utilized. For example, FIG. 9A shows a straight dipole antenna 140, FIG. 9B shows a folded dipole 150 similar to that of FIG. 4, FIG. 9C shows another folded dipole 160, and FIG. 9D shows a meander dipole 170.

Any of these alternative dipole antenna configurations could be advantageously utilized in the present invention.

Returning to FIG. 4, the RF tag 100 further includes parasitic elements 122, 123 extending parallel to the first and second dipole sections 111, 112, respectively. The parasitic elements 122, 123 are arranged such that a spacing S is provided between the parasitic elements and the folded dipole sections 115, 116, respectively. The parasitic elements 122, 123 may be further coupled to side bars 124, 125 to form generally L-shaped elements, with the side bars 124, 125 arranged to provide a fixed spacing with dipole sections 113, 114, respectively. As with the dipole antenna sections, the parasitic elements may be formed of electrically conductive materials, such as metal.

Figure 6:
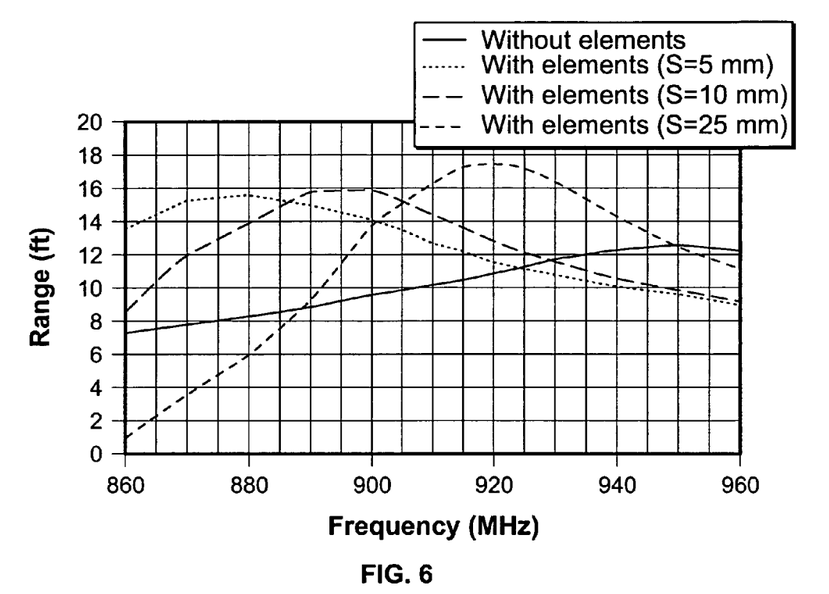
FIG. 6 is a graph illustrating variation in RF tag range for several positions of tag parasitic elements relative to the tag antenna.

The resonant frequency of the dipole antenna of the RF tag 100 can be controlled by selecting appropriate spacing S, which as discussed above affects the imaginary part of the antenna impedance $X_a$. Generally, the dipole antenna may be tuned to a lower frequency by including the side bars and/or reducing the width of the spacing S. FIG. 6 graphically illustrates variation in measured range versus frequency for four different configurations of dipole antenna, including: (a) tag without any parasitic elements; (b) tag with parasitic elements and spacing S of 5 mm; (c) tag with parasitic elements and spacing S of 10 mm; and (d) tag with parasitic elements and spacing S of 25 mm. The four antenna configurations each satisfy a tag minimum range requirement of 12 ft at different frequency bands. Specifically, tag configuration (a) can operate in Japan (950-956 MHz band), tag configuration (b) can operate in Europe (868 MHz band), and tag configuration (d) can operate in the United States (902-928 MHz). In other words, the same tag can be adapted to operate in different global regions by changing the location of the parasitic elements.

Figure 7:
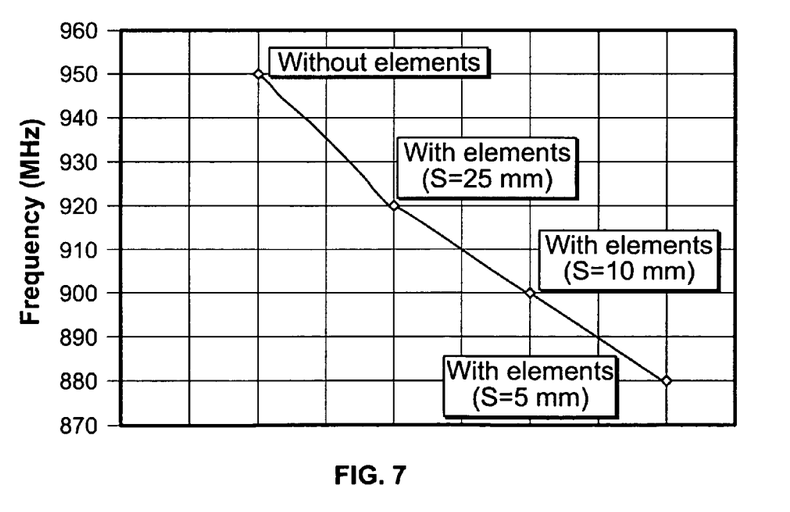
FIG. 7 is a graph illustrating variation in RF tag resonant frequency for several positions of tag parasitic elements relative to the tag antenna.

Likewise, FIG. 7 graphically illustrates variation in tag resonant frequency for the same four different configurations of dipole antenna. Without any parasitic elements, tag configuration (a) resonates at 950 MHz. By selecting parasitic element spacings S of 25 mm, 10 mm and 5 mm, the tag resonant frequency changes to 920 MHz, 900 MHz, and 880 MHz, respectively. Thus, the resonant frequency of the tag depends on the parasitic element spacing. It should be appreciated that other resonant frequencies can also be obtained by varying the parasitic element spacing in like manner.

It should also be appreciated that the complex antenna impedance $Z_a$ is also affected by the material to which the RF tag is affixed, e.g., glass, cardboard, wood. The spacing S of the parasitic elements with regard to the dipole antenna elements should therefore also take into account the materials to which the tag will be affixed. The measurements described above with respect to FIGS. 6 and 7 reflect test data collected from an exemplary RF tag affixed to a cardboard box, which represents a typical application of the RF tag in a conventional shipping label. Similar measurements performed with the RF tag affixed to alternate materials would show some variability in the resonant frequency and range measurements. It would be considered within the general skill in the art to adjust the spacings S in order to achieve resonant frequency and range measurements suitable for use in the desired geographic regions of interest.

Figure 8:
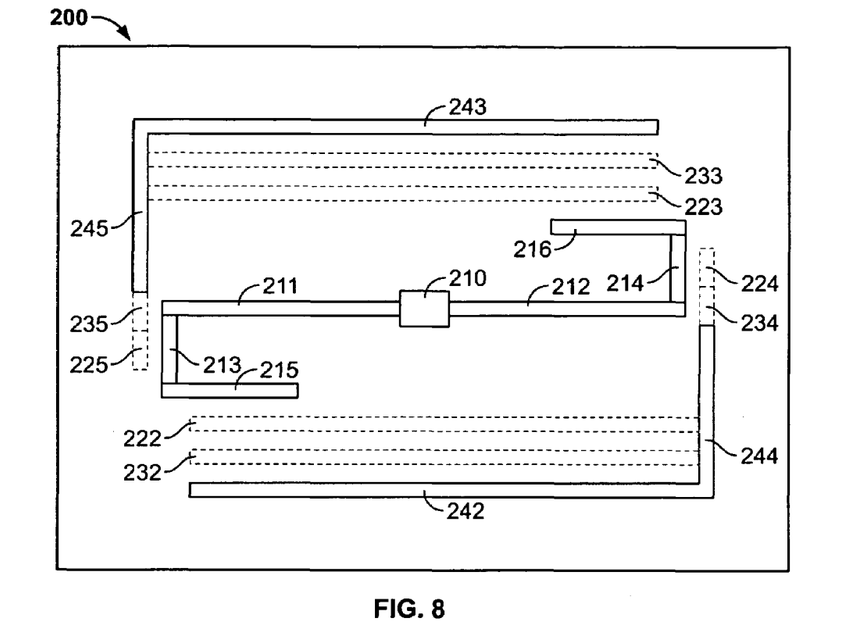
FIGS. 8A-8D illustrate alternative embodiments of the RF tag antenna.

Referring now to FIG. 8, an embodiment of the invention is shown as including an RF tag 200. As in FIG. 4, the RF tag 200 includes a RF transponder circuit 210 operatively coupled to a dipole antenna comprising segments 212, 214, 216 and 211, 213, 215. The RF tag 200 include a plurality of alternative locations for affixing parasitic elements in relation to the dipole antenna, denoted in broken lines. The parasitic elements each comprise L-shaped structures having elements 242, 243 extending parallel to the axis of the dipole antenna and elements 244, 245 extending perpendicular to the dipole antenna axis. As shown in FIG. 8, the parasitic elements can each positioned in one of three locations, including a first parasitic location corresponding to spaces 222-225, a second parasitic location corresponding to spaces 232-235, and a third location corresponding to the shown location for parasitic elements 242-245. These alternative locations would be physically marked onto the substrate 202 to permit a user to physically affix parasitic elements thereto. For example, parasitic elements formed of conductive materials could be provided with an adhesive backing that permits the user to select an appropriate parasitic element shape and affix it to a desired one of the locations.

The RF tag 200 could further be marked with appropriate text, graphics or other indicia, such as to identify locations in relation to geographic regions. For example, spaces 222-225 could be marked for use in Europe, and spaces 242-245 could be marked for use in the U.S. Thus, a user desiring to configure an RF tag for operation in Europe could simply affix parasitic elements to the appropriate locations indicated on the substrate 202. Alternatively, or in addition, there could be spaces on the RF tag 200 corresponding to different materials to which the tag would be affixed, such as cardboard, wood, glass, etc. For example, there may be multiple spaces for a certain geographic region in combination with certain materials, such as U.S./glass, U.S./cardboard, etc. It is anticipated that a user would be provided with a kit that includes an assortment of sizes and shapes of parasitic elements along with templates or instructions showing how and where to affix the parasitic elements to the RF tag in order to achieve operability within a desired geographic region.

Figure 10:
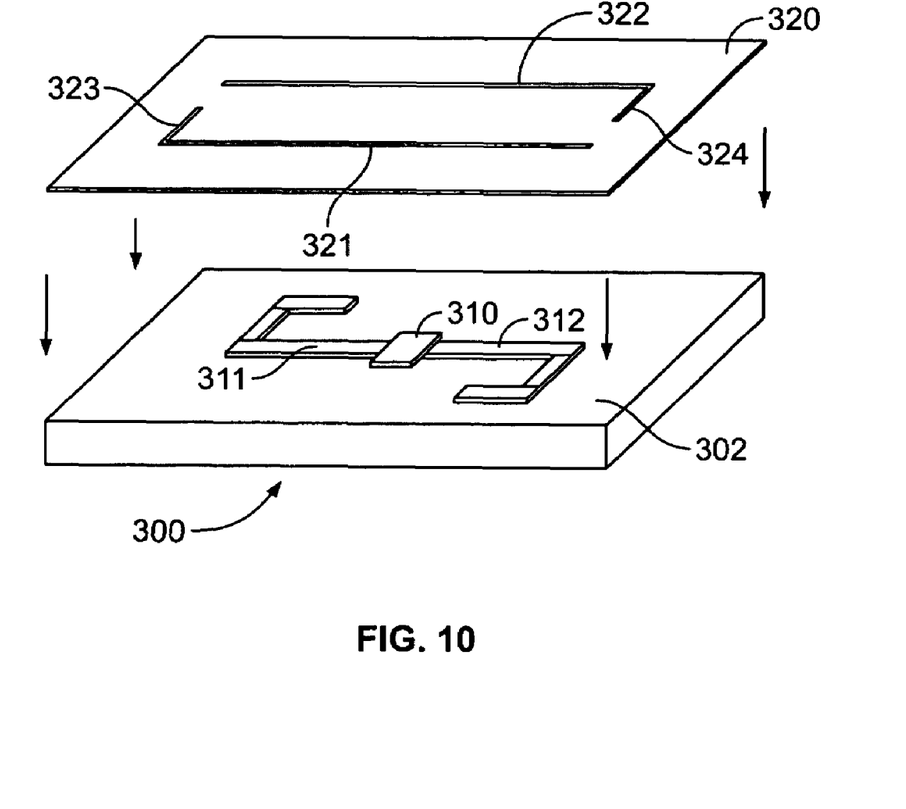
FIG. 10 is a perspective view of a global RF tag in accordance with another alternative embodiment of the invention.

FIG. 10 illustrates another embodiment of the invention as including an RF tag 300. As in FIG. 4, the RF tag 300 includes a substrate 302 carrying an RF transponder circuit 310 operatively coupled to a dipole antenna comprising segments 311, 312. The RF tag 300 is intended to be used in combination with an insert card 320. The exemplary insert card 320 includes parasitic elements 322, 323 formed thereon. The insert card 320 would be overlayed on top of the RF tag 300 so that the parasitic elements 322, 323 provide an impedance adjusting effect as discussed above. It should be appreciated that the shape and spacing of the parasitic elements 322, 323 of FIG. 8 are merely exemplary, and that the precise shape and spacing would be selected to tune the RF tag 300 for use in a desired geographic region. The insert card 320 may be comprised of any suitable material, such as polyimide or polyester, with the parasitic elements 322, 323 comprised of electrically conductive materials patterned onto the card using known techniques. The insert card 320 may be adhesively bound to the RF tag 300, or the two structures may be carried in a common envelope that is in turn affixed to an object of interest.

In one particular embodiment, the user may be provided with a kit containing an assortment of insert cards having parasitic elements of various shapes and locations corresponding to different geographic regions. The cards may include graphics, text or other indicia identifying their particular configuration or designation. The user may select an appropriate one of the insert cards for use in a particular geographic region and include the card with the RF tag in the manner described above.

In another embodiment, the insert cards may be made by the user, such as by printing onto paper card stock using conductive inks. The user may be provided with a computer program adapted to run on a conventional personal computer. The computer program may provide the user with a menu that enables selection of geographic regions and/or material types. Once such a selection is made, the computer program will command the printing of an appropriate card having parasitic elements selected especially for the particular usage. The card would then be included with the RF tag in the manner described above.

Having thus described a preferred embodiment of a global RF tag that can be tuned for use under any national or regional standards, it should be apparent to those skilled in the art that certain advantages of the described system have been achieved. It should also be appreciated that various modifications, adaptations, and alternative embodiments thereof may be made within the scope and spirit of the present invention. The invention is defined solely by the following claims.

What is claimed is:

1. An RF transponder, comprising:
a transponder integrated circuit;
an antenna connected to said RE transponder integrated circuit; and
at least one parasitic element adapted to interact electrically with said antenna and thereby affect antenna impedance, wherein orientation of said at least one parasitic element with respect to said antenna is selectable from among a plurality of pre-defined orientations to achieve a desired operational frequency band for the RF transponder.

2. The RF transponder of claim 1, wherein said antenna comprises a dipole antenna.

3. The RF transponder of claim 1, wherein said antenna comprises a folded dipole antenna.

4. The RF transponder of claim 1, wherein said antenna comprises a meander dipole antenna.

5. The RF transponder of claim 1, wherein spacing between said antenna and said at least one parasitic element is selectable from among a plurality of pre-defined spacings to achieve said desired operational frequency band.

6. The RF transponder of claim 5, wherein a first pre-defined spacing enables an operational frequency band suitable for a first geographic region, a second pre-defined spacing enables an operational frequency band suitable for a second geographic region, and a third pre-defined spacing enables an operational frequency band suitable for a third geographic region.

7. The RF transponder of claim 1, wherein spacing between said antenna and said at least one parasitic element is selectable from among a plurality of pre-defined spacings to achieve said desired operational frequency band for a particular geographic region.

8. The RF transponder of claim 1, wherein spacing between said antenna and said at least one parasitic element is selectable from among a plurality of pre-defined spacings to achieve said desired operational frequency band for a particular material to which the RF transponder is affixed.

9. The RF transponder of claim 1, wherein at least one said parasitic elements further comprises an L-shaped structure.

10. The RF transponder of claim 1, further comprising a substrate layer, said transponder integrated circuit and said antenna being affixed to said substrate layer.

11. The RF transponder of claim 10, wherein said substrate layer further comprises indicia provided thereon defining plural predetermined locations corresponding to said plurality of pre-defined orientations for affixing said at least one parasitic elements thereto.

12. The RF transponder of claim 11, wherein said at least one parasitic elements further comprise an adhesive layer permitting attachment to at least one of said plural predetermined locations.

13. The RF transponder of claim 10, further comprising an insert card having said at least one parasitic elements formed thereon, said insert card being placed in close proximity to said substrate layer.

14. The RF transponder of claim 13, wherein said insert card is adhesively coupled to said substrate layer.

15. The RF transponder of claim 13, wherein said at least one parasitic elements are comprised of conductive ink.

16. A method of tuning an RF transponder having a transponder integrated circuit and an antenna connected to said RF transponder integrated circuit, the RF transponder further having a plurality of pre-defined orientations for disposing a parasitic element, the method comprising selectively disposing at least one parasitic element with respect to said antenna in one of the plurality of pre-defined orientations to achieve a desired operational frequency band for the RF transponder, said at least one parasitic element being adapted to interact electrically with said antenna and thereby affect antenna impedance in correspondence with spacing between said antenna and said at least one parasitic element.

17. The method of claim 16, wherein said selectively disposing step further comprises selecting said spacing between said antenna and said at least one parasitic element from among a plurality of pre-defined spacings to achieve said desired operational frequency band.

18. The method of claim 17, further comprising selecting a first one of said plurality of pre-defined spacings to enable an operational frequency band suitable for a first geographic region, selecting a second one of said plurality of pre-defined spacings to enable an operational frequency band suitable for a second geographic region, and selecting a third one of said plurality of pre-defined spacings to enable an operational frequency band suitable for a third geographic region.

19. The method of claim 17, further comprising selecting said spacing to enable an operational frequency band suitable for a particular geographic region.

20. The method of claim 17, further comprising selecting said spacing to enable an operational frequency band suitable for a particular material to which the RF transponder is affixed.

21. The method of claim 17, wherein said RF transponder further comprises a substrate layer, said orienting step further comprising affixing said at least one parasitic element to said substrate layer.

22. The method of claim 21, wherein said substrate layer further comprises indicia provided thereon defining said plurality of pre-defined orientations, said selectively disposing step further comprising selecting one of said plurality of pre-defined orientations for affixing said at least one parasitic element thereto.

23. The method of claim 22, wherein said affixing step further comprises adhesively affixing said at least one parasitic element to at least one of said plurality of pre-defined orientations.

24. The method of claim 17, further comprising providing said at least one parasitic element on an insert card and placing said insert card in close proximity to said RF transponder.

25. The method of claim 24, further comprising adhesively coupling said insert card to said substrate layer.

26. The method of claim 24, further comprising printing said at least one parasitic elements on said insert card using conductive ink.

27. An RF transponder kit comprising:
- at least one RF transponder including a substrate, a transponder integrated circuit affixed to said substrate, and an antenna affixed to said substrate and electrically connected to said transponder integrated circuit; and
- a plurality of parasitic elements each adapted to interact electrically with said antenna and thereby affect antenna impedance, wherein said substrate comprises a plurality of pre-defined orientations that are each adapted to receive selected ones of said plural parasitic elements oriented with respect to said antenna to achieve a desired operational frequency band for the RF transponder.

28. The RF transponder kit of claim 27, wherein said antenna comprises a dipole antenna.

29. The RF transponder kit of claim 27, wherein said antenna comprises a folded dipole antenna.

30. The RF transponder kit of claim 27, wherein said antenna comprises a meander dipole antenna.

31. The RF transponder kit of claim 27, wherein spacing between said antenna and each of said plurality of pre-defined orientations is selected to achieve a corresponding operational frequency band.

32. The RF transponder kit of claim 31, wherein a first one of said plurality of pre-defined orientations enables an operational frequency band suitable for a first geographic region, a second one of said plurality of pre-defined orientations enables an operational frequency band suitable for a second geographic region, and a third one of said plurality of pre-defined orientations enables an operational frequency band suitable for a third geographic region.

33. The RF transponder of claim 31, wherein spacing between said antenna and said at least one parasitic element is selected to achieve said desired operational frequency band for a particular material to which the RF transponder is affixed.

34. The RF transponder kit of claim 27, wherein at least one of said plural parasitic elements further comprises an L-shaped structure.

35. The RF transponder kit of claim 27, wherein said substrate layer further comprises indicia provided thereon defining said plurality of pre-defined orientations for affixing said selected ones of said plural parasitic elements thereto.

36. The RF transponder kit of claim 35, wherein said plural parasitic elements each further comprises an adhesive layer permitting attachment to said plurality of pre-defined orientations.

37. The RF transponder kit of claim 27, further comprising an insert card having ones of said plural parasitic elements formed thereon, said insert card being adapted for placement in close proximity to said substrate layer.

38. The RF transponder kit of claim 37, wherein said ones of said plural parasitic elements are comprised of conductive ink.

* * * * *